(12) United States Patent
Steinberg et al.

(10) Patent No.: US 11,550,445 B1
(45) Date of Patent: Jan. 10, 2023

(54) SOFTWARE SAFETY-LOCKED CONTROLS TO PREVENT INADVERTENT SELECTION OF USER INTERFACE ELEMENTS

(71) Applicant: Raytheon Company, Waltham, MA (US)

(72) Inventors: Richard K. Steinberg, Huntsville, AL (US); Angelos Erilus, McCordsville, IN (US); Brian Scarpiniti, Lower Burrell, PA (US); Laura Strater, Dallas, TX (US); Rimantas T. Meckauskas, Fishers, IN (US); Garrett Zabala, Huntsville, AL (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/368,679

(22) Filed: Jul. 6, 2021

(51) Int. Cl.
*G06F 3/048* (2013.01)
*G06F 3/04817* (2022.01)
*G06F 3/0482* (2013.01)

(52) U.S. Cl.
CPC ........ *G06F 3/04817* (2013.01); *G06F 3/0482* (2013.01)

(58) Field of Classification Search
None
See application file for complete search history.

(56) References Cited

U.S. PATENT DOCUMENTS

| 6,985,137 | B2 | 1/2006 | Kaikuranta |
| 8,136,053 | B1 | 3/2012 | Miller et al. |
| 8,607,159 | B2 | 12/2013 | Friedlander et al. |
| 8,952,987 | B2* | 2/2015 | Momeyer ............ G06F 3/0488 345/633 |
| 9,445,238 | B2 | 9/2016 | Johnson et al. |
| 9,513,744 | B2 | 12/2016 | Pryor |
| 9,678,656 | B2 | 6/2017 | Santos-Gomez |

(Continued)

FOREIGN PATENT DOCUMENTS

| CN | 1327319 C | 7/2007 |
| JP | 6697051 B2 | 5/2020 |

(Continued)

OTHER PUBLICATIONS

Liptak, "The US Navy will replace its touchscreen controls with mechanical ones on its destroyers," The Verge, Aug. 2019, 3 pages.

*Primary Examiner* — Thanh T Vu (57) ABSTRACT

A method includes displaying a user interface having a first region with one or more user interface elements and determining whether a shield is in a locked state or an unlocked state. The shield covers the first region when in the locked state and uncovers at least part of the first region when in the unlocked state. The method includes, in response to determining that the shield is in the locked state, displaying the shield covering the first region and disabling the user interface element(s). The method includes, in response to receiving user input on the shield while the shield is in the locked state, changing the shield to the unlocked state. Additionally, the method includes, in response to determining that the shield is in the unlocked state, displaying the first region such that the user interface element(s) is/are not covered by the shield and enabling the user interface element(s).

20 Claims, 11 Drawing Sheets

(56) References Cited

U.S. PATENT DOCUMENTS

| | | |
|---|---|---|
| 9,758,042 B2 | 9/2017 | Pryor |
| 9,891,732 B2 | 2/2018 | Westerman |
| 10,430,043 B2 | 10/2019 | Rosinko et al. |
| 2003/0034185 A1 | 2/2003 | Kaikuranta |
| 2006/0022955 A1* | 2/2006 | Kennedy ............. G06F 3/04883 |
| | | 345/173 |
| 2009/0174679 A1 | 7/2009 | Westerman |
| 2011/0072400 A1 | 3/2011 | Watanabe et al. |
| 2013/0102281 A1* | 4/2013 | Kanda .................... G06F 21/36 |
| | | 455/410 |
| 2014/0071060 A1 | 3/2014 | Santos-Gomez |
| 2015/0363086 A1* | 12/2015 | Uno ...................... G06F 3/0488 |
| | | 715/765 |
| 2016/0162043 A1 | 6/2016 | Jones et al. |

FOREIGN PATENT DOCUMENTS

| | | |
|---|---|---|
| WO | 2006008343 A1 | 1/2006 |
| WO | 2014120177 A1 | 8/2014 |
| WO | 2017032085 A1 | 3/2017 |

* cited by examiner

SOFTWARE SAFETY-LOCKED CONTROLS TO PREVENT INADVERTENT SELECTION OF USER INTERFACE ELEMENTS

TECHNICAL FIELD

This disclosure generally relates to human-machine user interfaces. More specifically, this disclosure relates to software safety-locked controls to prevent inadvertent selection of user interface elements.

BACKGROUND

In various situations, humans may suffer from confirmation fatigue. For example, humans often ignore dialog confirmations when using user interfaces to perform various functions. According to research, people fail to read dialog confirmations over 50% of the time. As a result, a human who is interacting with an on-screen button or other user interface element may inadvertently select the user interface element and confirm the inadvertent selection by failing to read or ignoring an associated dialog confirmation.

Legacy hardware buttons (such as joysticks, push buttons, levers, and wall switches) provide tactile feedback. For example, in a manual transmission vehicle, a driver cannot physically put a gear shifter into reverse gear while a vehicle is in forward motion. Unfortunately, the conversion of hardware buttons into software buttons creates human interaction problems since software buttons provide little or no tactile feedback compared to hardware buttons.

SUMMARY

This disclosure provides software safety-locked controls to prevent inadvertent selection of user interface elements.

In a first embodiment, a method includes displaying a user interface that includes a first region having one or more user interface elements. The method also includes determining whether a shield is in a locked state or an unlocked state. The shield is configured to cover the first region when the shield is in the locked state and to uncover at least part of the first region when the shield is in the unlocked state. The method further includes, in response to determining that the shield is in the locked state, displaying the shield covering the first region and disabling the one or more user interface elements from receiving user input. The method also includes, in response to receiving user input on the shield while the shield is in the locked state, changing the shield to the unlocked state. In addition, the method includes, in response to determining that the shield is in the unlocked state, displaying the first region such that the one or more user interface elements are not covered by the shield and enabling the one or more user interface elements to receive user input.

In a second embodiment, an apparatus includes at least one processor configured to initiate display of a user interface that includes a first region having one or more user interface elements. The at least one processor is also configured to determine whether a shield is in a locked state or an unlocked state. The shield is configured to cover the first region when the shield is in the locked state and to uncover at least part of the first region when the shield is in the unlocked state. The at least one processor is further configured, in response to determining that the shield is in the locked state, to initiate display of the shield covering the first region and disable the one or more user interface elements from receiving user input. The at least one processor is also configured, in response to receiving user input on the shield while the shield is in the locked state, to change the shield to the unlocked state. In addition, the at least one processor is configured, in response to determining that the shield is in the unlocked state, to initiate display of the first region such that the one or more user interface elements are not covered by the shield and enable the one or more user interface elements to receive user input.

In a third embodiment, a non-transitory computer readable medium embodies computer readable program code that when executed causes at least one processor to initiate display of a user interface that includes a first region having one or more user interface elements. The computer readable program code when executed also causes the at least one processor to determine whether a shield is in a locked state or an unlocked state. The shield is configured to cover the first region when the shield is in the locked state and to uncover at least part of the first region when the shield is in the unlocked state. The computer readable program code when executed further causes the at least one processor, in response to determining that the shield is in the locked state, to initiate display of the shield covering the first region and disable the one or more user interface elements from receiving user input. The computer readable program code when executed also causes the at least one processor, in response to receiving user input on the shield while the shield is in the locked state, to change the shield to the unlocked state. In addition, the computer readable program code when executed causes the at least one processor, in response to determining that the shield is in the unlocked state, to initiate display of the first region such that the one or more user interface elements are not covered by the shield and enable the one or more user interface elements to receive user input.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which:

FIGS. 2A through 3F illustrate a first example user interface supporting a software safety-locked control to prevent inadvertent selection of a user interface element according to this disclosure;

DETAILED DESCRIPTION

FIGS. 1 through 7, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, in various situations, humans may suffer from confirmation fatigue. For example, humans often ignore dialog confirmations when using user interfaces to perform various functions. According to some research, people fail to read dialog confirmations over 50% of the time. As a result, a human who is interacting with an on-screen button or other user interface element may inadvertently select the user interface element and confirm the inadvertent selection by failing to read or ignoring an associated dialog confirmation. Legacy hardware buttons (such as joysticks, push buttons, levers, and wall-switches) provide tactile feedback. For example, in a manual transmission vehicle, a driver cannot physically put a gear shifter into reverse gear while a vehicle is in forward motion. Unfortunately, the conversion of hardware buttons into software buttons creates human interaction problems since software buttons provide little or no tactile feedback compared to hardware buttons. When combined, these issues raise the strong potential for a user to inadvertently select a software button and then confirm the inadvertent selection since there is no tactile or other feedback. This disclosure provides software safety-locked controls to prevent inadvertent selection of user interface elements.

Figure 1:
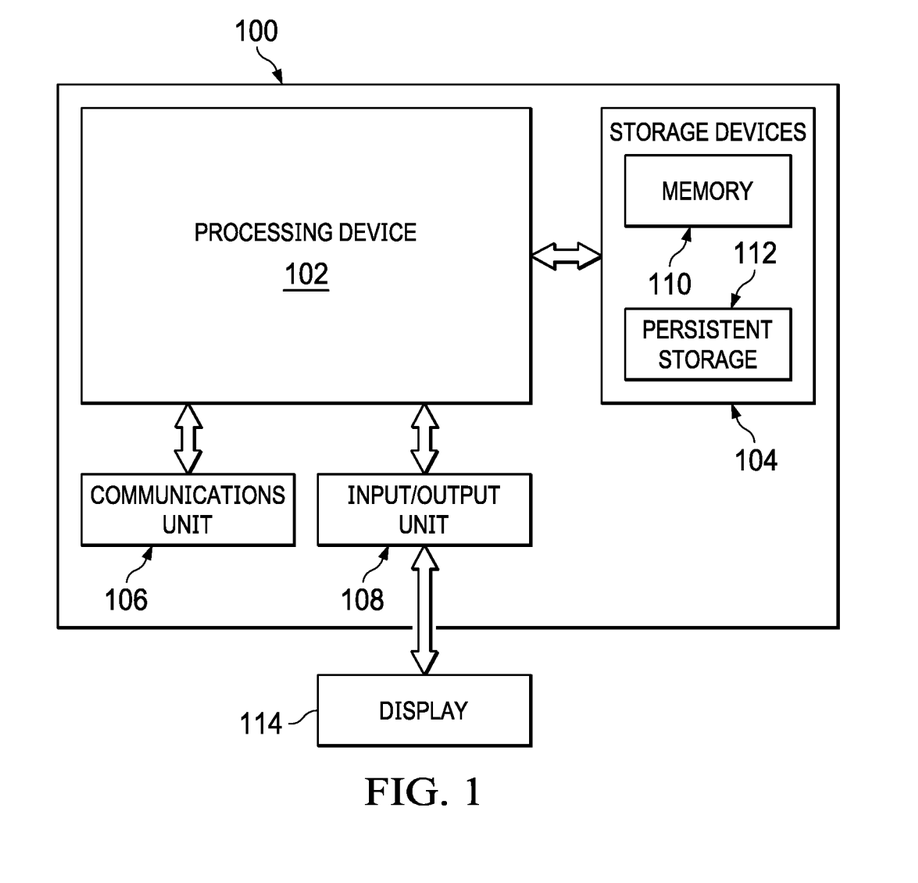
FIG. 1 illustrates an example device supporting the use of software safety-locked controls to prevent inadvertent selection of user interface elements according to this disclosure.

FIG. 1 illustrates an example device 100 supporting the use of software safety-locked controls to prevent inadvertent selection of user interface elements according to this disclosure. As shown in FIG. 1, the device 100 denotes a computing device or system that includes at least one processing device 102, at least one storage device 104, at least one communications unit 106, and at least one input/output (I/O) unit 108. The processing device 102 may execute instructions that can be loaded into a memory 110. The processing device 102 includes any suitable number(s) and type(s) of processors or other processing devices in any suitable arrangement. Example types of processing devices 102 include one or more microprocessors, microcontrollers, digital signal processors (DSPs), application specific integrated circuits (ASICs), field programmable gate arrays (FPGAs), or discrete circuitry.

The memory 110 and a persistent storage 112 are examples of storage devices 104, which represent any structure(s) capable of storing and facilitating retrieval of information (such as data, program code, and/or other suitable information on a temporary or permanent basis). The memory 110 may represent a random access memory or any other suitable volatile or non-volatile storage device(s). The persistent storage 112 may contain one or more components or devices supporting longer-term storage of data, such as a read only memory, hard drive, Flash memory, or optical disc.

The communications unit 106 supports communications with other systems or devices. For example, the communications unit 106 can include a network interface card or a wireless transceiver facilitating communications over a wired or wireless network. The communications unit 106 may support communications through any suitable physical or wireless communication link(s).

The I/O unit 108 allows for input and output of data. For example, the I/O unit 108 may provide a connection for user input through a keyboard, mouse, keypad, touchscreen, or other suitable input device. The I/O unit 108 may also send output to a display, printer, or other suitable output device. In this example, the I/O unit 108 is coupled to a display 114, which in some cases may represent a touchscreen.

In some embodiments, the instructions executed by the processing device 102 include instructions supporting the use of software safety-locked controls, which can be used to prevent inadvertent selection of user interface elements on the display 114. For example, the instructions may cause the processing device 102 to initiate the display of a user interface on the display 114, where the user interface includes a specified region having one or more user interface elements (such as buttons). The instructions may also cause the processing device 102 to determine whether a shield is in a locked state or an unlocked state, where the shield may cover the specified region when in the locked state and uncover at least part of the specified region when in the unlocked state. The instructions may further cause the processing device 102, in response to determining that the shield is in the locked state, to initiate the display of the shield covering the first region and to disable the one or more user interface elements from receiving user input. The instructions may also cause the processing device 102, in response to receiving user input on the shield while the shield is in the locked state, to change the shield to the unlocked state. In addition, the instructions may cause the processing device 102, in response to determining that the shield is in the unlocked state, to initiate display of the first region such that the one or more user interface elements are not covered by the shield and enable the one or more user interface elements to receive user input.

Although FIG. 1 illustrates one example of a device 100 supporting the use of software safety-locked controls to prevent inadvertent selection of user interface elements, various changes may be made to FIG. 1. For example, computing and communication devices and systems come in a wide variety of configurations, and FIG. 1 does not limit this disclosure to any particular computing or communication device or system. Also, in some cases, the display 114 may be integrated into the device 100.

FIGS. 2A through 3F illustrate a first example user interface 200 supporting a software safety-locked control to prevent inadvertent selection of a user interface element according to this disclosure. For ease of explanation, the user interface 200 may be described as being generated by the device 100 and presented on the display 114 in FIG. 1. However, the user interface 200 may be used with any other suitable device and in any other suitable system.

Figure 2A:
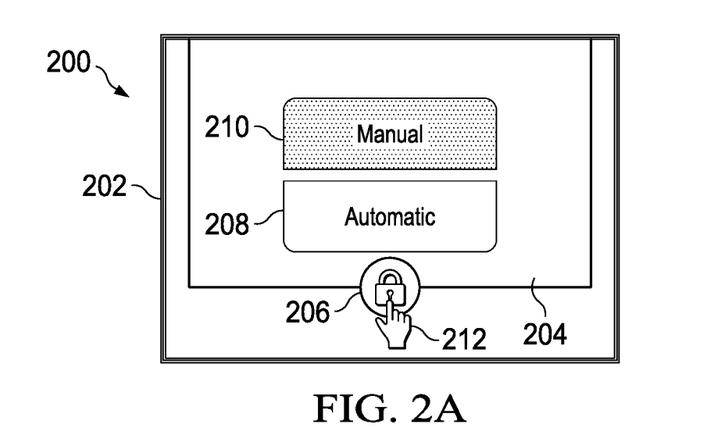

As shown in FIG. 2A, the user interface 200 includes a region 202 with a shield 204 that covers the region 202. In FIG. 2A, the shield 204 is in a locked state, so the shield 204 covers most or all of the region 202. The shield 204 includes a lock icon 206, which is displayed as a locked padlock in FIG. 2A to represent the locked state of the shield 204. The region 202 also includes one or more high-consequence user interface elements 208 and 210. The user interface elements 208 and 210 here represent buttons that can be used to determine whether a machine operates in manual or automatic mode. Note that these examples for the user interface elements 208 and 210 are for illustration only. The region 202 may include any number of user interface elements (including a single user interface element), and each user interface element may be associated with any suitable feature or function. The user interface elements 208 and 210 here are referred to as "high-consequence" since selection of the wrong user interface element 208 or 210 may be problematic, such as when selection of the wrong user interface element may result in, for example, injury, death and/or damage to property or valuable/critical assets. Note, however, that this is for illustration only and does not limit this disclosure to use with any particular types of user interface elements.

While the shield 204 is in the locked state, the high-consequence user interface elements 208 and 210 are disabled, meaning the user interface elements 208 and 210 are unable to respond to user input. For example, while the shield 204 is in the locked state, a user may be unable to select one of the user interface elements 208 and 210 by touching the display 114. Also, while the shield 204 is in the locked state, one of the user interface elements 208 or 210 may be visually highlighted, such as by being brighter, blinking, or colored a certain way, compared to the other user interface element 210 or 208. This allows the user to identify the current selection of one of the user interface elements 208 or 210. In FIG. 2A, for example, the user interface element 210 may represent the current operating mode for a machine. In some embodiments, the shield 204 is translucent so that the user interface elements 208 and 210 are at least partially visible beneath the shield 204.

In FIG. 2A, the shield 204 is in the locked state, and a cursor 212 (which here takes the form of a hand) is shown contacting the lock icon 206. The cursor 212 represents a location where a user may touch the display 114 with his or her finger or a stylus. The cursor 212 may also represent a mouse pointer or other pointing device's current location on the display 114. The cursor 212 here represents some form a user input on the lock icon 206, such as a tap on the lock icon 206 or a swipe of the lock icon 206. Note, however, that some embodiments may allow a user input at other locations of the shield 204.

Figure 2B:
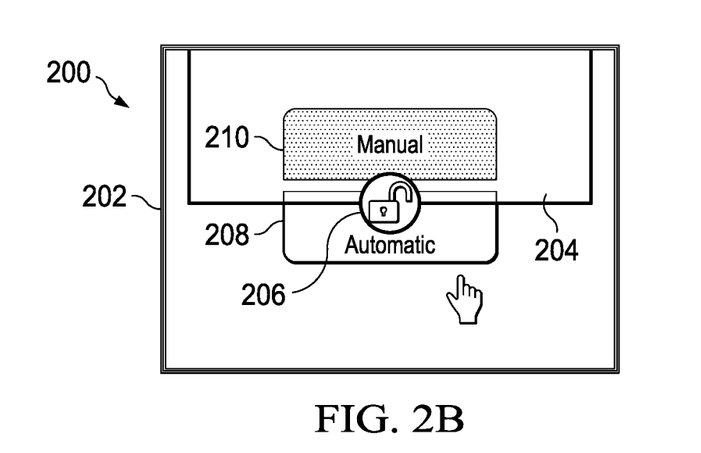
Figure 2C:
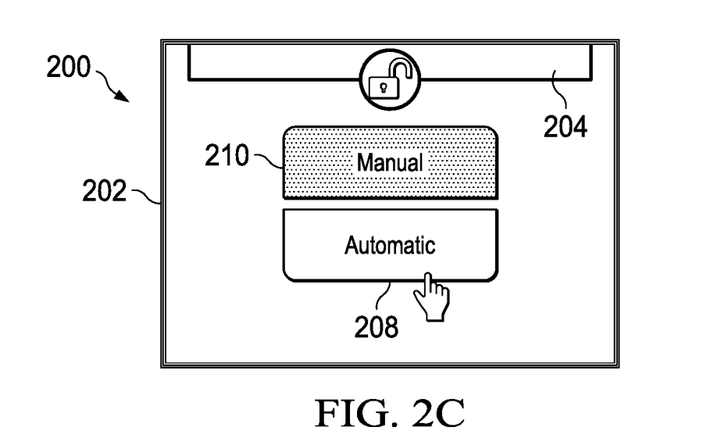

In response to receiving this user input on the shield 204 while the shield 204 is in the locked state, the shield 204 moves upward and the lock icon 206 becomes an unlocked padlock as shown in FIG. 2B. The shield 204 continues to move upward until it uncovers most or all of the region 202 as shown in FIG. 2C. At this point, the user interface elements 208 and 210 are substantially or completely uncovered, and the user interface elements 208 and 210 can be enabled to receive user input.

Figure 2D:
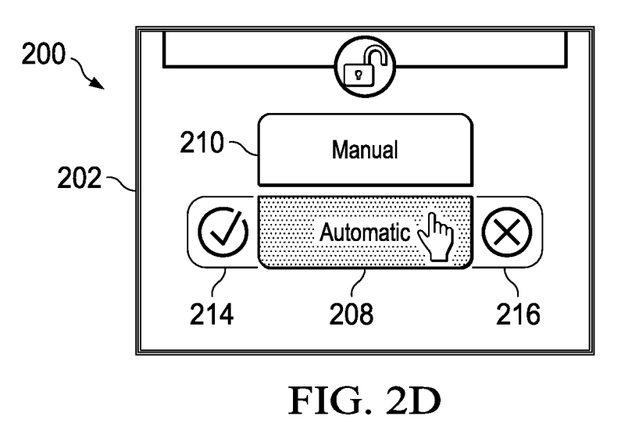

In FIG. 2D, it is assumed that the user has selected the user interface element 208, which in this example would change the operating mode from manual to automatic. This causes the selected user interface element 208 to become highlighted or otherwise visually identifiable. In response to receiving this user input on the user interface element 208, the device 100 initiates a confirmation procedure, which here includes presenting at least two confirmation buttons (namely an accept confirmation button 214 and a reject confirmation button 216 in this example). The confirmation buttons 214 and 216 can be displayed at respective locations that are within the region 202. However, the confirmation buttons 214 and 216 can be displayed at locations that do not overlap with the selected user interface element 208. Here, the two confirmation buttons 214 and 216 are displayed on opposite sides of the selected user interface element 208, although this is for illustration only. If the user inadvertently provides input separate from one of the confirmation buttons 214 and 216 (such as on a user interface element 208 or 210) while the confirmation buttons 214 and 216 are both displayed, the confirmation procedure may remain incomplete, and no inadvertent selection occurs.

In another embodiment, in response to receiving the user input on the user interface element 208, the device 100 initiates a confirmation procedure by presenting only one confirmation button (e.g., accept confirmation button 214 or reject confirmation button 216). In a first example case, only the accept confirmation button 214 is presented as part of the confirmation procedure which disappears after expiration of a predetermined time period (e.g., 5 seconds) within which the user must respond to confirm the action for the confirmation procedure to complete. If the user does not provide an input on the confirmation button 214 within the time period, the confirmation procedure may remain incomplete. In a second example case, only the reject confirmation button 216 is presented as part of the confirmation procedure which disappears after expiration of a predetermined time period (e.g., 3 seconds) within which the user must respond to reject the previous selection on the user interface element 208. If the user does not provide an input on the reject button 216 within the time period, the confirmation procedure may complete based on the earlier user input on the user interface element 208.

One possible advantage of the approach shown here is that the confirmation buttons 214 and 216 are not presented in an overlapping manner with the selected user interface element, which helps to avoid the possibility of a user rapidly touching or otherwise selecting the same location on the display 114 to both select the user interface element and confirm the selection. Similarly, the lock icon 206 may be initially displayed at a location that does not overlap with the user interface elements 208 and 210 or with the confirmation buttons 214 and 216. Again, this helps to avoid the possibility of a user rapidly touching or otherwise selecting the same location on the display 114 to both unlock the shield 204 and select and/or confirm the user interface element. Further, in some cases, the confirmation buttons 214 and 216 do not include any text, which can reduce cognitive load on the user. In addition, the confirmation buttons 214 and 216 may not be positioned next to each other, which reduces the chances of a user inadvertently clicking on the accept confirmation button 214 while intending to click on the reject confirmation button 216 (or vice versa). This may be particularly useful in various situations, such as when a user (like an emergency medical technician) is physically unsteady on a moving vehicle (like an ambulance) or in high pressure/intense situations such as when a soldier/commander is trying to abort the launch of a missile via a control panel.

In some embodiments, the confirmation buttons 214 and 216 may be presented by sliding out or popping out from the sides of the selected user interface element 208. This reveals the confirmation buttons 214 and 216 gradually until they are completely revealed. In particular embodiments, the confirmation buttons 214 and 216 may be disabled from receiving user input while they are partially revealed and enabled only upon being completely revealed. This may enforce some minimum amount of time between selection of the user interface element 208 and confirmation or rejection of the selection. In other embodiments, the confirmation buttons 214 and 216 may be presented instantaneously or using other visual effects.

Figure 2E:
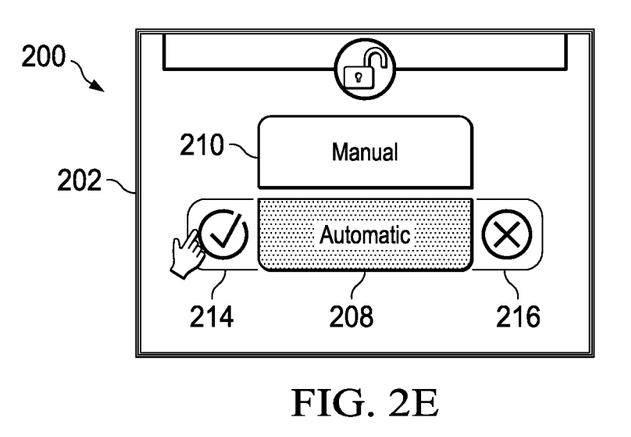
Figure 2F:
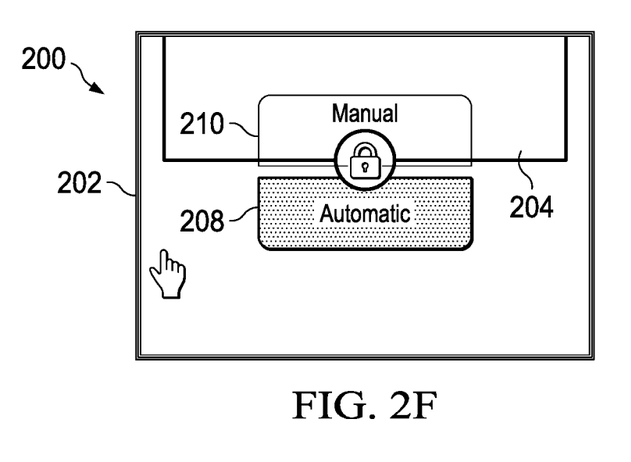
Figure 2G:
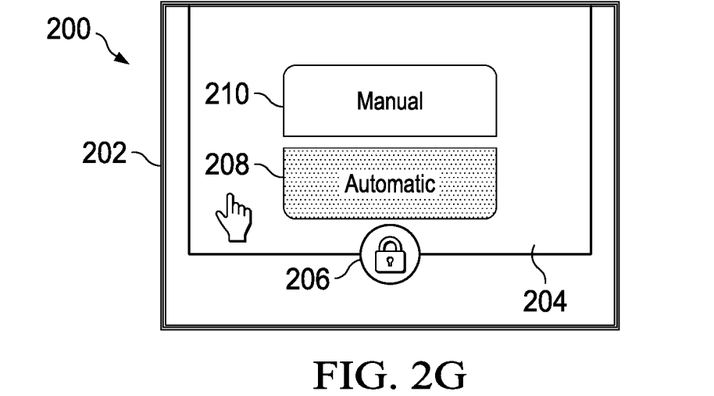
Figure 3A:
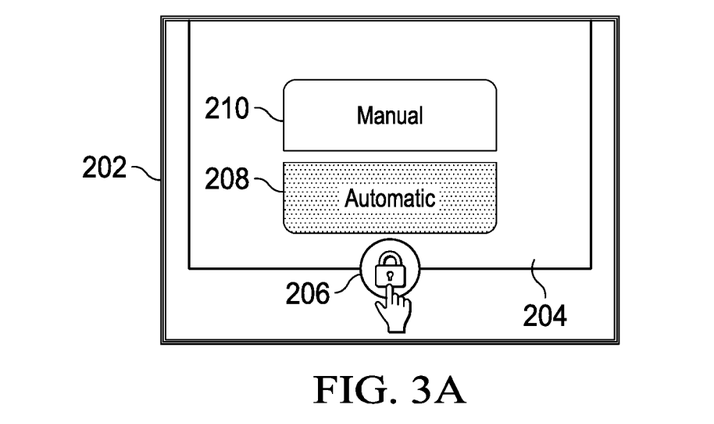
Figure 3B:
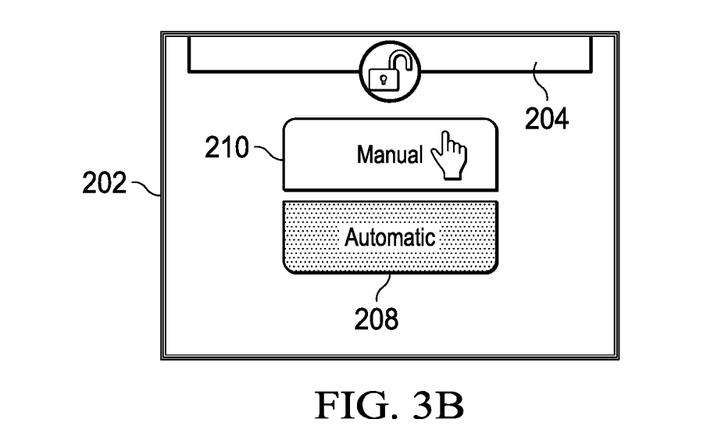
Figure 3C:
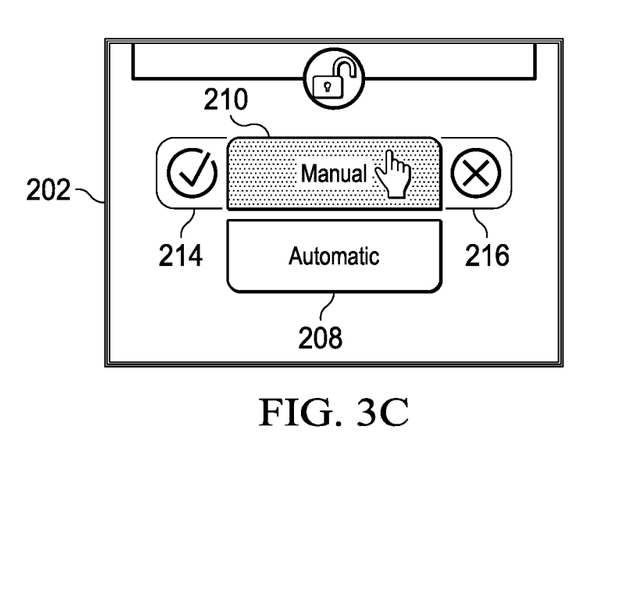
Figure 3D:
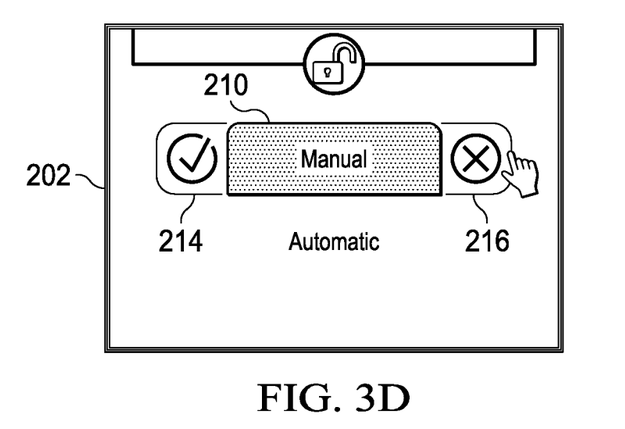
Figure 3E:
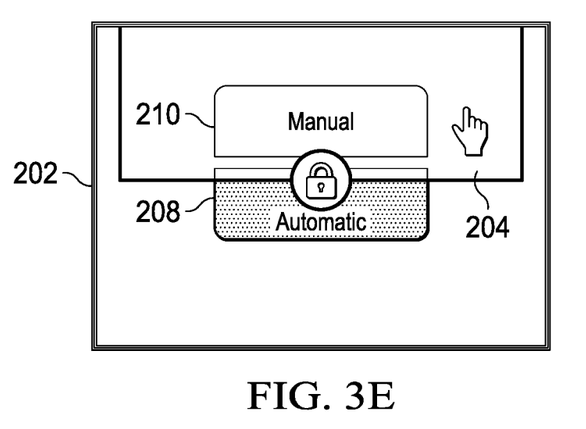
Figure 3F:
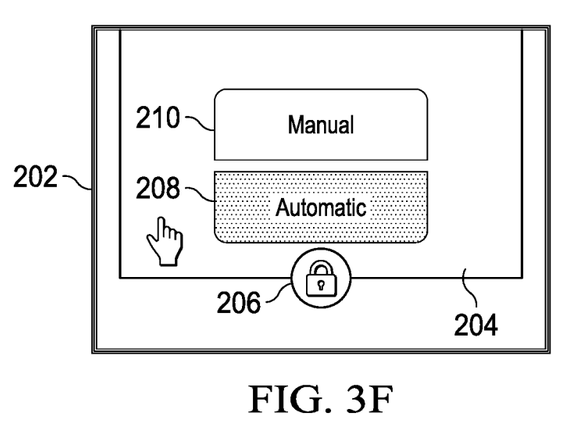

In FIG. 2E, the user is shown as selecting the confirmation button 214, which confirms the user's selection of the user interface element 208 and completes the confirmation procedure. At this point, the device 100 allows the mode of the machine to change or otherwise initiates one or more actions to implement a request from the user. As shown in FIGS. 2F and 2G, the shield 204 may then be lowered again (such as via sliding) to cover the region 202 of the user interface 200. This also disables the user interface elements 208 and 210 from receiving additional user input (at least until the shield 204 is unlocked again).

As can be seen here, the user provides multiple user inputs at multiple locations within the region 202 in order for a particular action to be invoked. In some embodiments, the user provides user inputs at two or three locations within the region 202 in order to unlock the shield 204 and initiate an action. By having the user move his or her finger, stylus, or cursor from a first location (such as the lock icon 206 or other area of the shield 204) to a second location (such as a user interface element) and then to a third location (such as a confirmation button), the inadvertent selection of a user interface element can be significantly reduced.

FIGS. 3A through 3F illustrate an alternative sequence using the user interface 200, where the user selects the reject confirmation button 216 instead of the accept confirmation button 214 when attempting to switch modes. As can be seen here, the shield 204 lowers without changing the current operating mode in response to the user input on the reject confirmation button 216.

Although FIGS. 2A through 3F illustrate a first example of a user interface 200 supporting a software safety-locked control to prevent inadvertent selection of a user interface element, various changes may be made to FIGS. 2A through 3F. For example, unlocking the shield 204 may involve inputting pre-registered credentials, a password, or other specified input prior to actually unlocking the shield 204 or allowing selection of a user interface element. Also, while buttons for manual and automatic mode are shown here, the user interface 200 may include any other suitable user interface element(s), such as one or more radio buttons, checkboxes, or sliders.

Figure 4A:
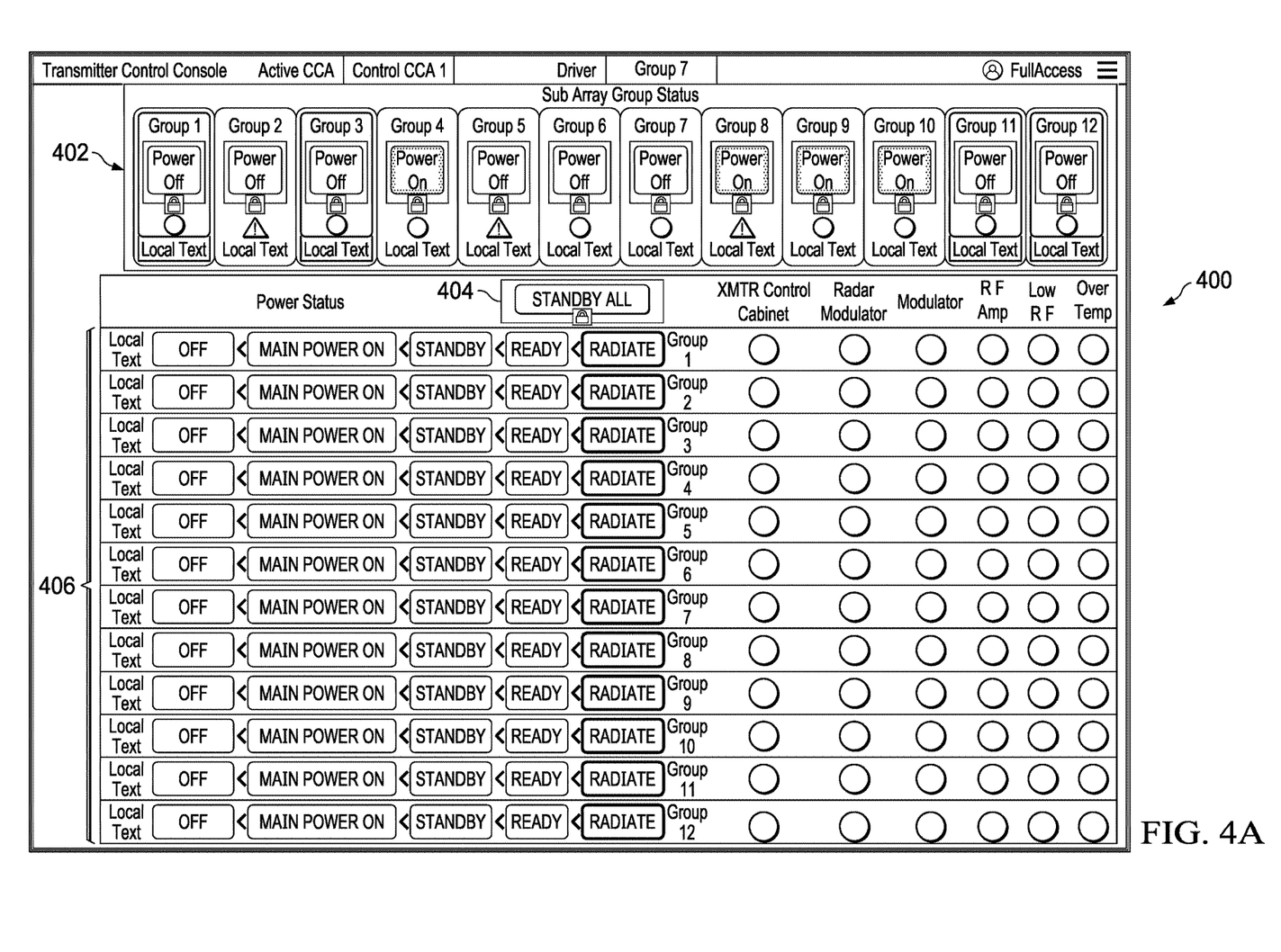
FIGS. 4A through 4C illustrate a second example user interface supporting a software safety-locked control to prevent inadvertent selection of a user interface element according to this disclosure.
Figure 4B:
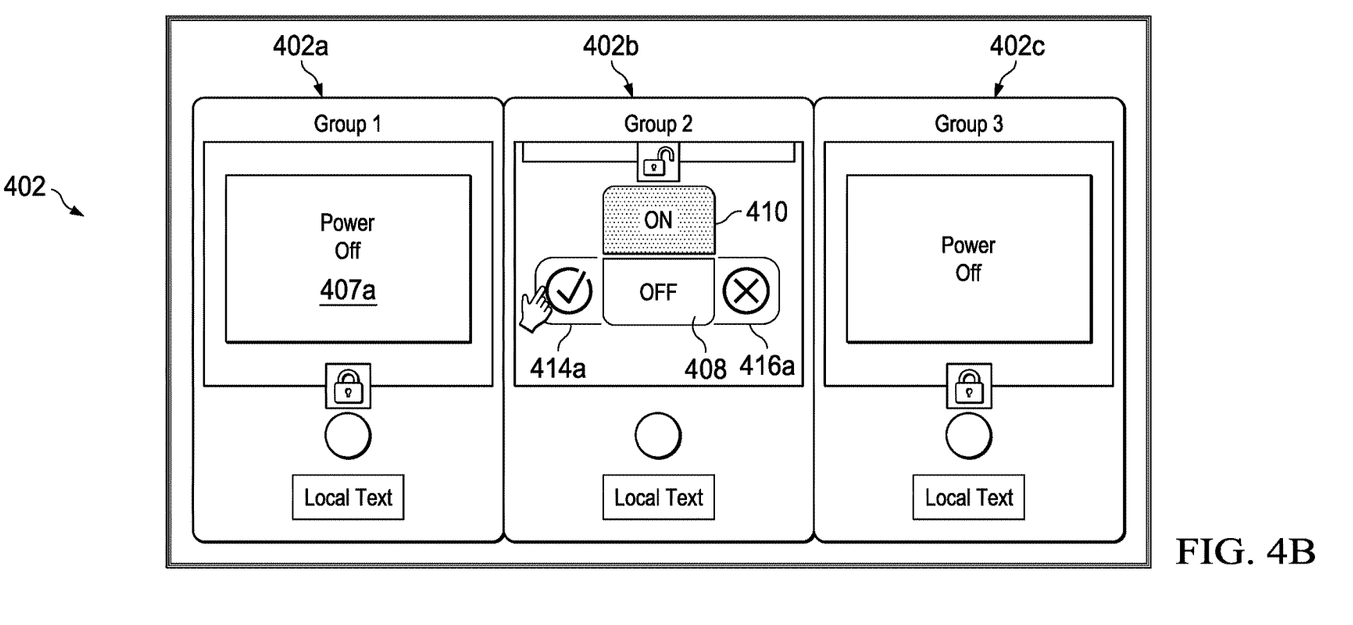
Figure 4C:
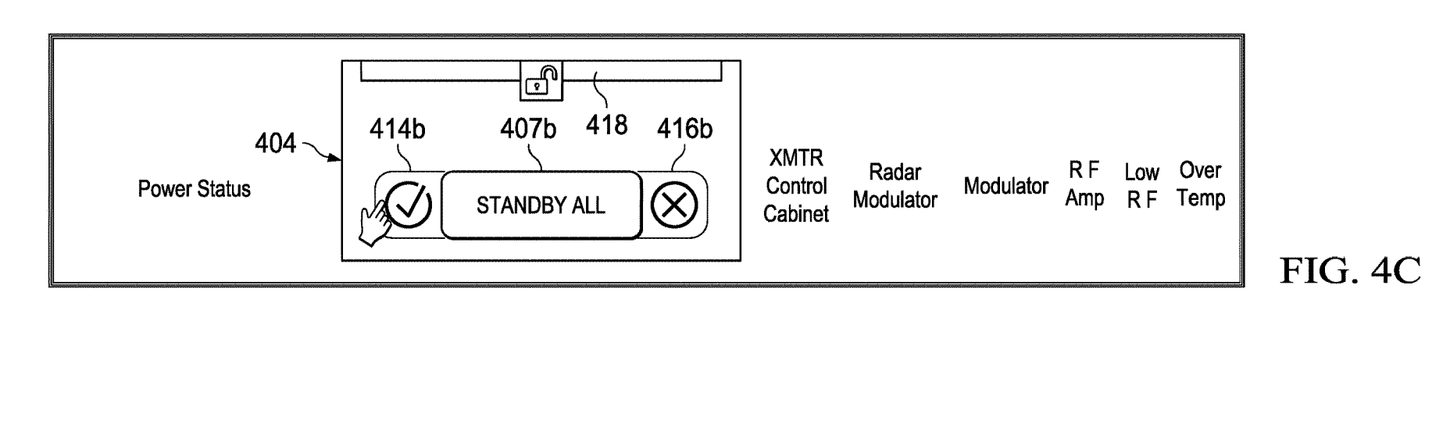

FIGS. 4A through 4C illustrate a second example user interface 400 supporting a software safety-locked control to prevent inadvertent selection of a user interface element according to this disclosure. For ease of explanation, the user interface 400 may be described as being generated by the device 100 and presented on the display 114 in FIG. 1. However, the user interface 400 may be used with any other suitable device and in any other suitable system.

As shown in FIG. 4A, the user interface 400 includes a number of regions 402 and 404 having software safety-locked controls, each of which may be the same as or similar to the region 202 described above. In this example, each region 402 includes a single user interface element that identifies a power status of an associated component, and the single user interface element may be selected (when the associated shield is unlocked) to toggle the power status of the associated component. Note that while power status is used here, each region 402 may include any number of user interface elements that can be used for any suitable purpose(s). The region 404 may be used to control a function applied to a group of machines (e.g., multiple radars that operate in respective operating states) or to a group of additional user interface elements in a second region 406, which do not have shields and thus can be changed without raising a shield or other functions described above. The second region 406, which is unshielded, does not overlap any one of the shield-protected regions 402 and 404.

Part of the region 402 is shown in enlarged form in FIG. 4B, which illustrates three regions 402a-402c. In this example, selection of a user interface element 407a (when an associated shield is in an unlocked state) can present the user with two user interface elements 408 and 410, which allows toggling of the current setting of the user interface element 407a. Selection of one of the user interface elements 408 and 410 can lead to the presentation of confirmation buttons 414a and 416a, which can be used as described above. Each region 402a-402c may have similar functionality.

Part of the region 404 is shown in enlarged form in FIG. 4C, which indicates that putting all components associated with the user interface elements within the second region 406 into a standby mode involves raising of a shield 418, selection of a user interface element 407b, and confirmation via one of multiple confirmation buttons 414b or 416b. This approach allows a user to control individual components without using a multi-step process, but the user may be prevented from performing at least one function unless the user goes through the multi-step process described above.

Although FIGS. 4A through 4C illustrate a second example of a user interface 400 supporting a software safety-locked control to prevent inadvertent selection of a user interface element, various changes may be made to FIGS. 4A through 4C. For example, unlocking a shield may involve inputting pre-registered credentials, a password, or other specified input prior to actually unlocking the shield or allowing selection of a user interface element. Also, while buttons and other controls for certain operations are shown here, the user interface 400 may include any other suitable user interface element(s). In addition, a user interface may include any number of protected user interface elements and unprotected user interface elements in any suitable configuration. There is also no requirement that a protected user interface element be used in conjunction with an unprotected user interface element.

Figure 5A:
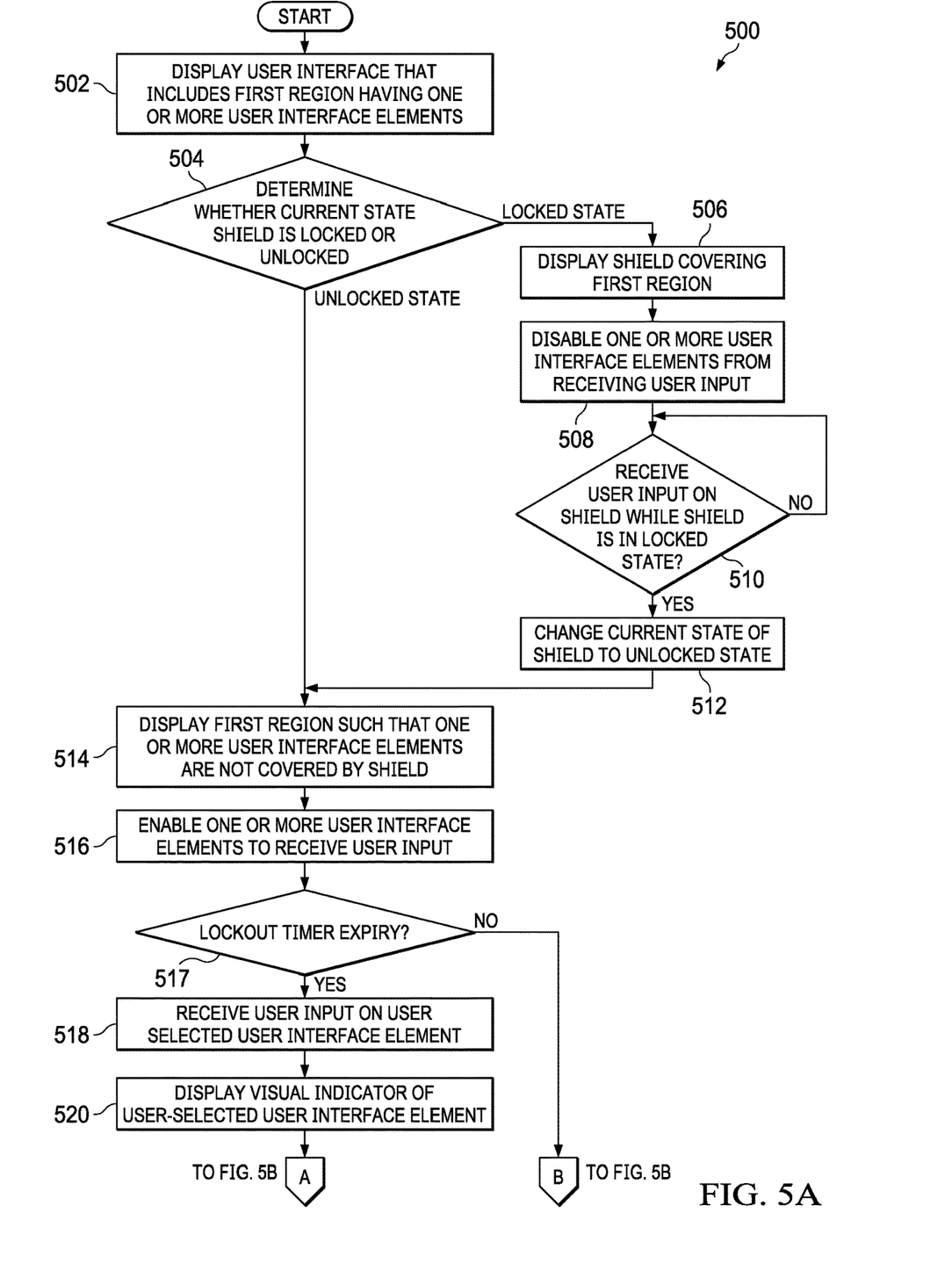
FIGS. 5A and 5B illustrate an example process for presenting a user interface element with a software safety-locked control according to this disclosure.
Figure 5B:
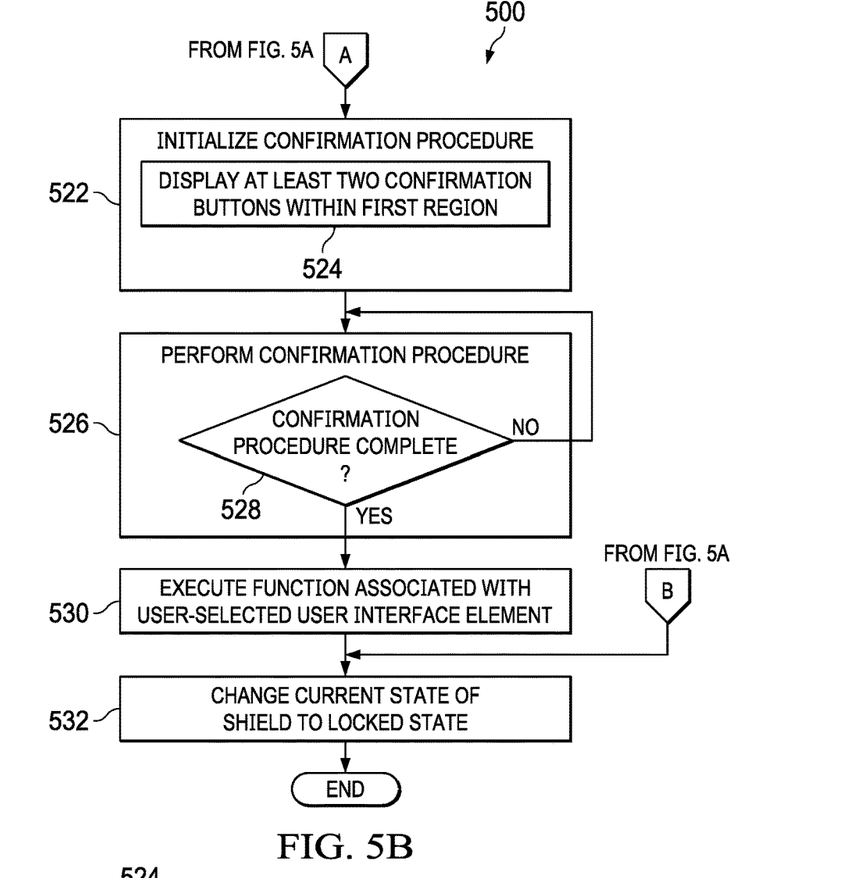

FIGS. 5A and 5B illustrate an example process 500 for presenting a user interface element with a software safety-locked control according to this disclosure. For ease of explanation, the process 500 is described as involving the processing device 102 executing program code (instructions) to present a user interface, such as the user interface 200 or 400. However, the process 500 may involve the use of any other suitable device in any other suitable system, and the process 500 may involve any suitable user interface.

As shown in FIG. 5A, at block 502, the processing device 102 displays a user interface that includes a first region. The first region includes one or more high-consequence buttons or other specified user interface elements. At block 504, the processing device 102 determines whether a shield associated with the first region is in a locked state or an unlocked state. The shield is configured to cover the first region when the shield is in the locked state and to uncover at least some of the first region when the shield is in the unlocked state. In response to determining that the shield is in the locked state, the process 500 proceeds to block 506. In response to determining that the shield is in the unlocked state, the process 500 proceeds to block 514.

At block 506, the processing device 102 displays the shield covering the first region. At block 508, the processing device 102 disables the one or more user interface elements from receiving user input. At block 510, the processing device 102 determines whether user input is received on the shield while the shield is in the locked state. If so, the processing device 102 changes the current state of the shield to the unlocked state.

At block 514, the processing device 102 displays the first region such that the one or more user interface elements are not covered by the shield. At block 516, the processing device 102 enables the one or more user interface elements to receive user input. In at least one embodiment, enabling the one or more user interface elements to receive user input further includes starting a lockout timer. At block 517, the processing device 102 determines whether any user input has been received on the one or more enabled user interface elements before a lockout period of time has elapsed, as indicated by expiration of the lockout timer. If no, the processing device 102 changes the current state of the shield to the locked state, as shown at block 532. If yes, at block 518, the processing device 102 receives user input on a user-selected user interface element from among the one or more enabled user interface elements. In response, at block 520, the processing device 102 displays a visual indicator of the user-selected user interface element.

As shown in FIG. 5B, at block 522, the processing device 102 initializes a confirmation procedure. Initializing the confirmation procedure may include displaying, at block 524, at least two confirmation buttons within or near the first region. At block 526, the processing device 102 performs or continues performance of the confirmation procedure. For example, performing the confirmation procedure may include determining, at block 528, whether the user has selected one of the confirmation buttons and the confirmation procedure is complete. If so, at block 530, the processing device 102 executes a function associated with the user-selected user interface element. In certain embodiments, the processing device 102 determines that the confirmation procedure is complete by determining that no user input has been received on the enabled confirmation buttons before a lockout period of time expires. At block 532, the processing device 102 changes the current state of the shield to the locked state.

Although FIGS. 5A and 5B illustrate one example of a process 500 for presenting a user interface element with a software safety-locked control, various changes may be made to FIGS. 5A and 5B. For example, while shown as a series of steps, various steps in FIGS. 5A and 5B may overlap, occur in parallel, occur in a different order, or occur any number of times. Also, the user may need to select multiple user interface elements in order to invoke a desired function, such as when selection of one user interface element presented additional user interface elements for selection.

Figure 6:
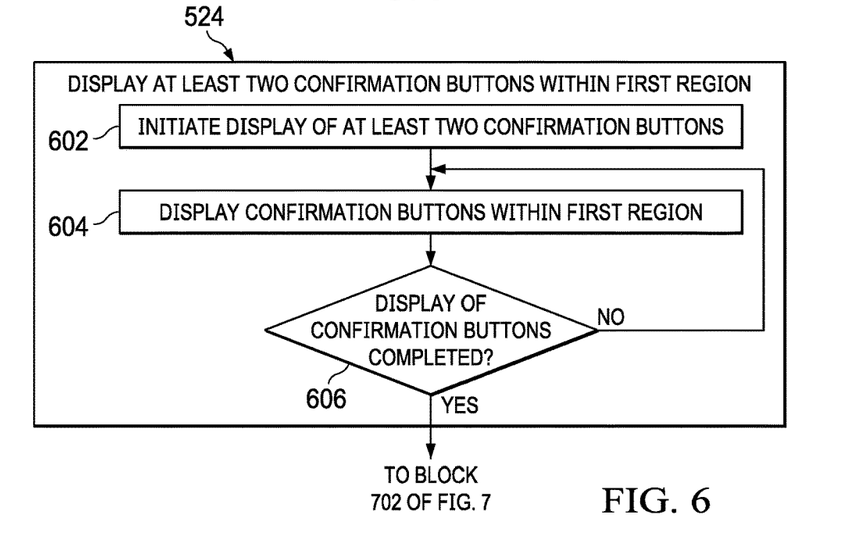
FIG. 6 illustrates an example sub-process for displaying at least two confirmation buttons associated with a user interface element according to this disclosure.

FIG. 6 illustrates an example sub-process 600 for displaying at least two confirmation buttons associated with a user interface element according to this disclosure. The sub-process 600 may, for example, occur as part of block 524. As shown in FIG. 6, the processing device 102 initiates display of at least two confirmation buttons with the first region at block 802. In some cases, the confirmation buttons may include an accept conformation button and a reject confirmation button. At block 804, the processing device 102 displays or continues revealing the at least two confirmation buttons within the first region. At block 806, the processing device 102 determines whether the display of the at least two confirmation buttons is completed, meaning the confirmation buttons have been completely revealed. If so, the process proceeds to block 702 of FIG. 7. As noted above, this gradual revealing of the confirmation buttons may allow for some desired amount of time to elapse after selection of a user interface element and prior to confirmation. In other cases, however, the confirmation buttons may be revealed instantaneously.

Figure 7:
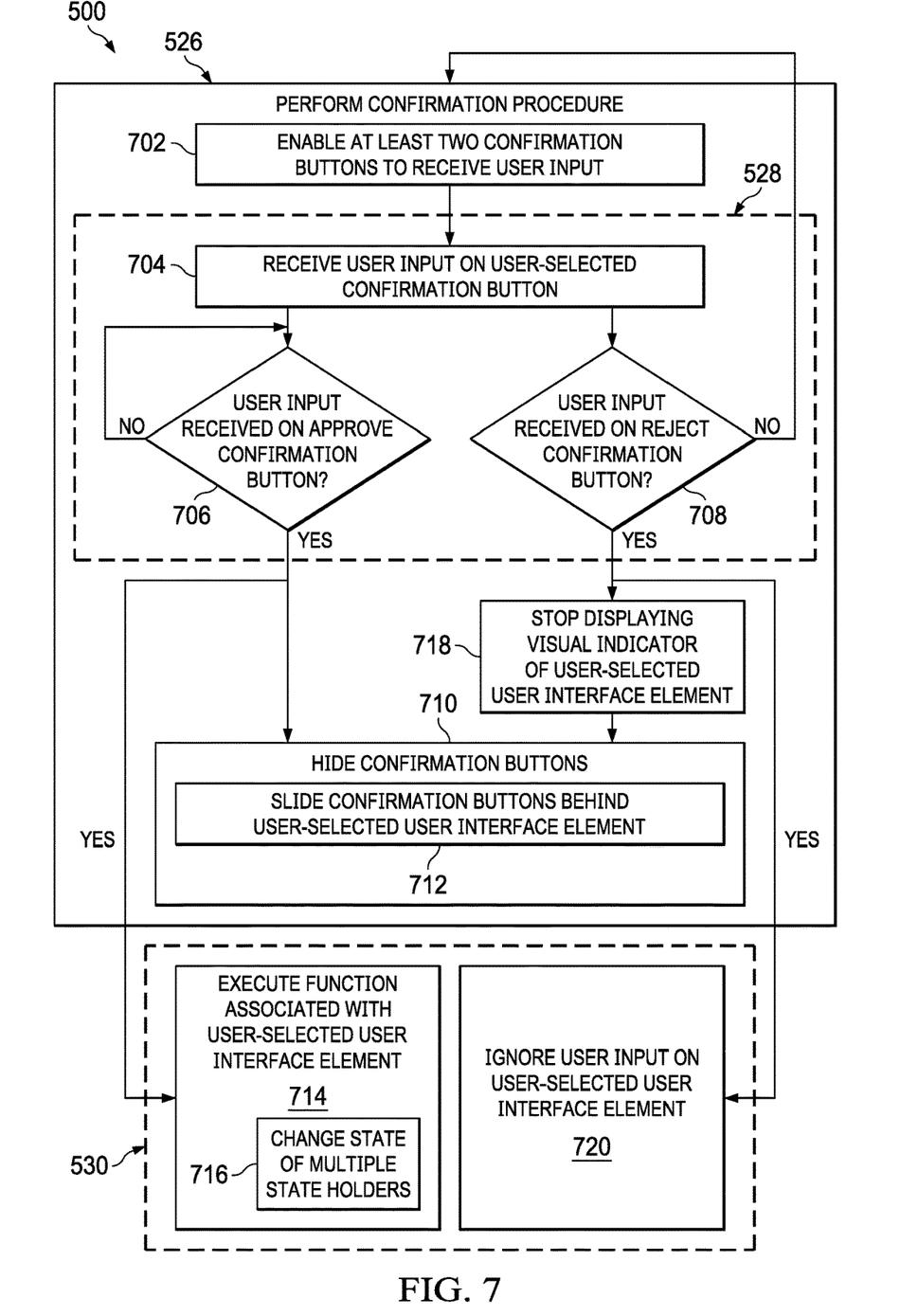
FIG. 7 illustrates example sub-processes for performing a confirmation procedure and executing a function associated with a user interface element according to this disclosure.

FIG. 7 illustrates example sub-processes 700 for performing a confirmation procedure and executing a function associated with a user interface element according to this disclosure. The sub-process 700 may, for example, occur as part of blocks 526-530. As shown in FIG. 7, at block 702, the processing device 102 enables the at least two confirmation buttons to receive user input. The processing device 102 determines whether the confirmation procedure is complete by receiving, at block 704, user input on a user-selected confirmation button from among the confirmation buttons. At block 706, the processing device 102 determines whether user input is received on the enabled accept confirmation button. If so, the process proceeds to blocks 710 and to block 714 (sequentially or in parallel). At block 708, the processing device 102 determines whether user input is received on the enabled reject confirmation button. If so, the process proceeds to blocks 718 and to block 720 (sequentially or in parallel).

At block 710, the processing device 102 hides the at least two confirmation buttons. For example, hiding of the at least two confirmation buttons may include sliding, at block 712, the confirmation buttons behind the user-selected user interface element. Note that other techniques for hiding the confirmation buttons, such as instantaneous removal of the confirmation buttons, may be used. At block 714, the processing device 102 executes the function associated with the user-selected user interface element by changing, at block 716, a state of multiple state holders. At block 718, the processor stops displaying the visual indicator of the user-selected high-consequence button. At block 720, the processor ignores the user input on the user-selected user interface element.

Although FIGS. 6 and 7 illustrate example sub-processes used in the process 500 of FIG. 5, various changes may be made to FIGS. 6 and 7. For example, while shown as a series of steps, various steps in FIGS. 6 and 7 may overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    displaying a user interface that comprises a first region including one or more user interface elements;
    determining whether a shield is in a locked state or an unlocked state, wherein the shield is configured to cover the one or more user interface elements of the first region when the shield is in the locked state and to uncover the one or more user interface elements of the first region when the shield is in the unlocked state;
    in response to determining that the shield is in the locked state, displaying the shield covering the first region and disabling the one or more user interface elements from receiving user input;
    in response to receiving user input on the shield while the shield is in the locked state, changing the shield to the unlocked state;
    in response to determining that the shield is in the unlocked state, displaying the first region with the one or more user interface elements such that the one or more user interface elements are not covered by the shield and enabling the one or more uncovered user interface elements to receive user input;
    receiving user input on a specified one of the one or more uncovered user interface elements; and
    in response to receiving the user input on the specified user interface element, initializing a confirmation procedure and displaying at least two confirmation user interface elements at respective locations within the first region, the respective locations not including a displayed location of the specified user interface element.

2. The method of claim 1, further comprising:
    in response to receiving user input on one of the at least two confirmation user interface elements, determining that the confirmation procedure is complete; and
    in response to determining that the confirmation procedure is complete, changing the shield to the locked state.

3. The method of claim 1, wherein the at least two confirmation user interface elements are displayed on different sides of the specified user interface element.

4. The method of claim 1, further comprising:
    receiving the user input on the shield, the user input on the shield comprising a user input on a lock icon of the shield.

5. The method of claim 4, wherein the lock icon is displayed at a location that does not overlap with the one or more user interface elements.

6. The method of claim 1, wherein:
    the user interface further comprises a second region that includes at least one additional user interface element; and
    the first region and the second region do not overlap.

7. The method of claim 1, wherein the shield is translucent and allows the one or more user interface elements to be partially visible beneath the shield when the shield is in the locked state.

8. An apparatus comprising:
    at least one processor configured to:
        initiate display of a user interface that comprises a first region including one or more user interface elements;
        determine whether a shield is in a locked state or an unlocked state, the shield configured to cover the one or more user interface elements of the first region when the shield is in the locked state and to uncover the one or more user interface elements of the first region when the shield is in the unlocked state;
        in response to determining that the shield is in the locked state, initiate display of the shield covering the first region and disable the one or more user interface elements from receiving user input;
        in response to receiving user input on the shield while the shield is in the locked state, change the shield to the unlocked state;
        in response to determining that the shield is in the unlocked state, initiate display of the first region with the one or more user interface elements such that the one or more user interface elements are not covered by the shield and enable the one or more uncovered user interface elements to receive user input;
        receive user input on a specified one of the one or more uncovered user interface elements; and
        in response to receiving the user input on the specified user interface element, initialize a confirmation procedure and initiate display of at least two confirmation user interface elements at respective locations within the first region, the respective locations not including a displayed location of the specified user interface element.

9. The apparatus of claim 8, wherein the at least one processor is further configured to:
    in response to receiving user input on one of the at least two confirmation user interface elements, determine that the confirmation procedure is complete; and
    in response to determining that the confirmation procedure is complete, change the shield to the locked state.

10. The apparatus of claim 8, wherein the at least one processor is configured to initiate display of the at least two confirmation user interface elements on different sides of the specified user interface element.

11. The apparatus of claim 8, wherein the at least one processor is further configured to receive the user input on the shield, the user input on the shield comprising a user input on a lock icon of the shield.

12. The apparatus of claim 11, wherein the at least one processor is further configured to initiate display of the lock icon at a location that does not overlap with the one or more user interface elements.

13. The apparatus of claim 8, wherein:
- the user interface further comprises a second region that includes at least one additional user interface element; and
- the first region and the second region do not overlap.

14. The apparatus of claim 8, wherein the shield is translucent and allows the one or more user interface elements to be partially visible beneath the shield when the shield is in the locked state.

15. A non-transitory computer readable medium embodying computer readable program code that when executed causes at least one processor to:
- initiate display of a user interface that comprises a first region including one or more user interface elements;
- determine whether a shield is in a locked state or an unlocked state, the shield configured to cover the one or more user interface elements of the first region when the shield is in the locked state and to uncover the one or more user interface elements of the first region when the shield is in the unlocked state;
- in response to determining that the shield is in the locked state, initiate display of the shield covering the first region and disable the one or more user interface elements from receiving user input;
- in response to receiving user input on the shield while the shield is in the locked state, change the shield to the unlocked state;
- in response to determining that the shield is in the unlocked state, initiate display of the first region with the one or more user interface elements such that the one or more user interface elements are not covered by the shield and enable the one or more uncovered user interface elements to receive user input;
- receive user input on a specified one of the one or more uncovered user interface elements; and
- in response to receiving the user input on the specified user interface element, initialize a confirmation procedure and initiate display of at least two confirmation user interface elements at respective locations within the first region, the respective locations not including a displayed location of the specified user interface element.

16. The non-transitory computer readable medium of claim 15, further embodying computer readable program code that when executed causes the at least one processor to:
- in response to receiving user input on one of the at least two confirmation user interface elements, determine that the confirmation procedure is complete; and
- in response to determining that the confirmation procedure is complete, change the shield to the locked state.

17. The non-transitory computer readable medium of claim 15, wherein the computer readable program code when executed causes the at least one processor to initiate display of the at least two confirmation user interface elements on different sides of the specified user interface element.

18. The non-transitory computer readable medium of claim 15, further embodying computer readable program code that when executed causes the at least one processor to receive the user input on the shield, the user input on the shield comprising a user input on a lock icon of the shield.

19. The non-transitory computer readable medium of claim 15, wherein:
- the user interface further comprises a second region that includes at least one additional user interface element; and
- the first region and the second region do not overlap.

20. The non-transitory computer readable medium of claim 15, wherein the shield is translucent and allows the one or more user interface elements to be partially visible beneath the shield when the shield is in the locked state.

* * * * *